US00H002052H

(19) United States

(12) Statutory Invention Registration (10) Reg. No.: US H2052 H

Molz, III et al. (43) Published: Dec. 3, 2002

(54) SMALL DRILL-HOLE, GAS MINI-PERMEAMETER PROBE

(75) Inventors: Fred J. Molz, III, Seneca, SC (US); Lawrence C. Murdoch, Clemson, SC (US); Cynthia L. Dinwiddie, Central, SC (US); James W. Castle, Clemson, SC (US)

(73) Assignee: Clemson University, Clemson, SC (US)

(21) Appl. No.: 09/827,701

(22) Filed: Apr. 7, 2001

(65) Prior Publication Data

US 2002/0144541 A1 Oct. 10, 2002

(51) Int. Cl.[7] ..... G01N 15/08

(52) U.S. Cl. ..... 73/38; 73/152.41; 702/12

(58) Field of Search ..... 73/38, 152.41; 702/12

(56) References Cited

U.S. PATENT DOCUMENTS 4,864,845 A * 9/1989 Chandler et al.

* cited by examiner

*Primary Examiner*—Charles T. Jordan
*Assistant Examiner*—M. Thomson

(57) ABSTRACT

The distal end of a basic tube element including a stopper device with an expandable plug is positioned in a pre-drilled hole in a rock face. Rotating a force control wheel threaded on the tube element exerts force on a sleeve that in turn causes the plug component of the stopper means to expand and seal the distal end of the tube in the hole. Gas under known pressure is introduced through the tube element. A thin capillary tube positioned in the tube element connects the distal end of the tube element to means to detect and display pressure changes and data that allow the permeability of the rock to be determined.

1 Claim, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SMALL DRILL-HOLE, GAS MINI-PERMEAMETER PROBE

The U.S. Government has a paid-up license in this invention and the right in limited circumstances to require the patent owners to license others on reasonable terms as provided for by the terms of contract No. DE-RA26-97BC 15029 awarded by the U.S. Department of Energy.

FIELD OF THE INVENTION

This invention is most generally characterized as a research instrument. It is a device used in research in geology. More specifically, it is a device used in the field to measure physical properties of rocks and similar geological materials. Even more specifically it is a device used to measure the permeability of rocks and similar geological materials in their natural (field) setting.

SUMMARY OF THE INVENTION

The invention comprises a hand-held, hand-operated device used to determine the permeability of rock in its field or natural setting. A tube with an expandable stopper is inserted into a pre-drilled hole in the rock. A wheel element threaded on the tube is rotated to exert a force on a sleeve that contacts the stopper. The stopper expands in response to the force, thereby sealing the hole. A gas from under known pressure is introduced through the tube and a junction box that connects the device to an external source of the gas. A thin capillary tube is positioned in the tube and connected through the junction box to data recording and display equipment. The flow of gas at a steady state is subject to analysis that yields permeability of the rock.

BACKGROUND OF THE INVENTION

The science of geology focuses on the understanding the physical and chemical nature and properties of the earth's crust, specifically those strata at or below the surface. Characterizing the basic physical and chemical properties of these rocky strata, including those strata exposed at the earth's surface, is fundamental to understanding, managing, and protecting geological resources such as minerals, fossil fuel reserves, and subsurface water resources, including water quality on which many human activities depend.

Permeability of rocks to fluids is an important, basic physical characteristic used to describe, distinguish, and classify numerous types of rocks and rocky strata. Permeability is an important physical property that influences how fluids of all types move into and through various rocky strata. In the face of justifiable, increasing concerns of pollution of sub-surface water resources and equally justifiable concerns related to decreasing supplies of fossil fuels, characterizing the strata through which water moves and through which pollutants may enter, as well as characterizing the strata in which fossil fuels are found, assumes importance other than basic scientific interest.

Unlike some sciences, field research is an essential element of basic research in geology. Obviously, considering the subject matter comprising geology, moving representative samples from a field site to the laboratory for study is commonly impractical, if not effectively impossible. Measurements made on relatively small samples removed from their natural settings may not reflect the characteristics of the materials in their natural state. Simple, cost effective devices to measure accurately the permeability of rocky materials in their natural setting are of immediate practical use and value, not only to the basic study of geology, but for the protection of certain natural resources.

Prior art reveals a variety of devices that are used for field determination of permeability of rocky strata. Although these devices to measure permeability may differ in structural detail, functionally they all are very similar, all involve the same basic concepts, and all suffer from the same general deficiencies.

In the most fundamental sense, permeability of a rocky material is determined by measuring the rate of flow of a fluid of known properties (often a gas) into the material with the fluid delivered under measured and controlled conditions. In the present application, the fluid used is a gas. When both the flow and pressure reach and maintain a stable (time-independent event) state, permeability may be determined. Devices for this procedure require a source of gas under pressure, a valve system to control the rate and pressure of gas delivery, and suitable devices to display flow rate and pressure. Such valve systems and devices are readily available. In addition a means to deliver the gas to the study material is required. This means is a tube commonly described as a probe, the distal end of which is adapted to form a seal between the surface of the rock and the probe interior.

With existing probe devices, the user manually applies pressure to the device to form the necessary seal between the probe and surface of the rock. A defective seal yields unreliable results because both the flow of the gas and pressure are affected to an unknown extent. The gas is delivered by mechanical means through the flow measuring means to the tube and through the tube to the tube/rock interface. The pressure at the distal end of the probe in relation to the flow of the gas is a measure of resistance to flow into the rock, or the permeability of the rock. By means well known to those skilled in the art, the flow and pressure readings are transformed into permeability values that in turn may be compared with other samples.

The greatest deficiencies of the prior art are found in aspects of the device described above: the seal at the interface between the distal end of the probe and the rock may be defective; measurements may vary as a result of the skill and experience of the individual using the device; fatigue and use in awkward positions may affect the quality of the seal, and permeability estimates are based on characteristics of the weathered surface of the rock, and this surface generally is recognized by those skilled in the art as not being fully representative of the parent, unweathered rock material.

BRIEF DESCRIPTION OF THE INVENTION

The small drill-hole gas mini-permeameter device comprises a probe element formed from a metal tube. The distal end of the tube element is fitted with a stopper element that can be manually expanded by operation of a wheel element rotatably attached to the probe. A junction box threaded to the proximal end of the probe element provides the mechanical support for the means used to deliver gas from an independent source to the probe and to measure the flow of the gas and the pressure of the gas at the distal end of the probe.

Under field conditions, the probe is inserted into a previously drilled hole in the rock to be studied. The wheel element is rotated to cause the stopper element to expand, thereby forming a tight seal between the walls of the hole and the device. Gas is introduced and flow and pressure are constantly monitored. Permeability is calculated using flow and pressure values when both are stable (time-independent). Upon completion, the rotation is reversed and the device removed for reuse. The unique aspect of this device is its design to be used in a small drill hole, rather than on the surface of the rock.

DETAILED DESCRIPTION OF THE FIGURES

Figure 1:
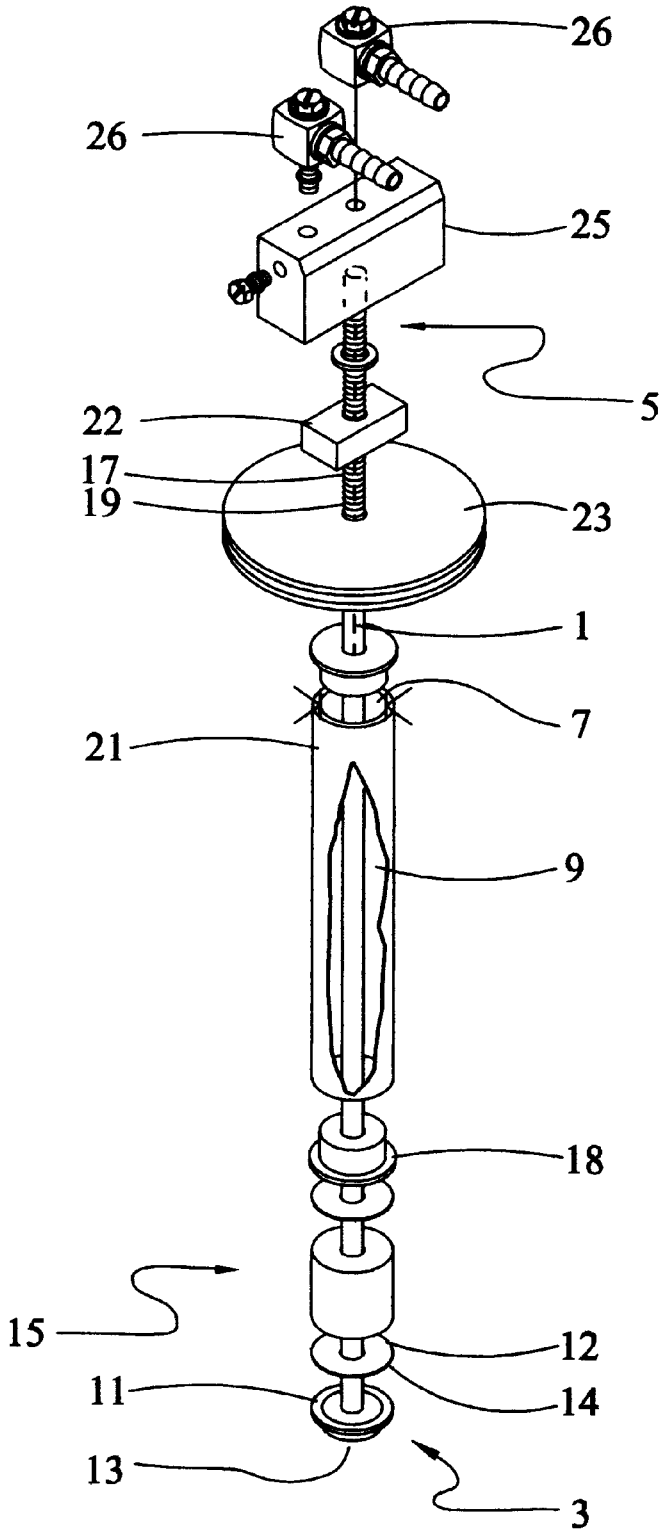
FIG. 1 provides a schematic representation of the invention showing the major elements of the device and their relative structural relationships.

FIG. 1 presents schematic illustration of the major elements of the device and their structural relationships. A basic tube element 1 has a distal end 3 and a proximal end 5. An open core 7 extends the full length of the basic tube element. The open core 7 is in the center of the basic tube element and has a diameter 9. A base plate 11 is securely attached to and centered on the distal end 3 of the basic tube element 1. An opening 13 in the center of the base plate 11 is aligned with the open core 7 at the distal end 3 of the basic tube element 1. A stopper means 15 is positioned on the basic tube element 1, said basic tube element component 1 functionally being the center axis of the stopper means 15. The stopper means 15 rests on the upper surface 12 of a flat metal washer 14 that may be fused to the base plate 11. The outer wall 17 of basic tube element 1 is threaded 19 from its proximal end 5 to a point approximately two-thirds of the length of the basic tube element, extending from the proximal end 5 towards the distal end 3 of the basic tube element 1. A rigid sleeve element 21 is positioned on the basic tube element 1 immediately above and contacting the uppermost surface 18 of the stopper means 15. A force control wheel 23 capable of moving vertically on the basic tube element 1 is threaded on to and rotationally connected to the basic tube element 1. A junction element 25 is threaded to the proximal end 5 of the basic tube element 1. The junction element 25 provides mechanical means 26 to connect flow and pressure sensing means to the device and to introduce pressurized gas into the basic tube element 1. The junction element 25 also includes related locking elements 22 threaded to the proximal end 5 of the basic tube element 1. The junction element 25 functionally serves as the upper cap 27 for the basic tube element 1.

Figure 2:
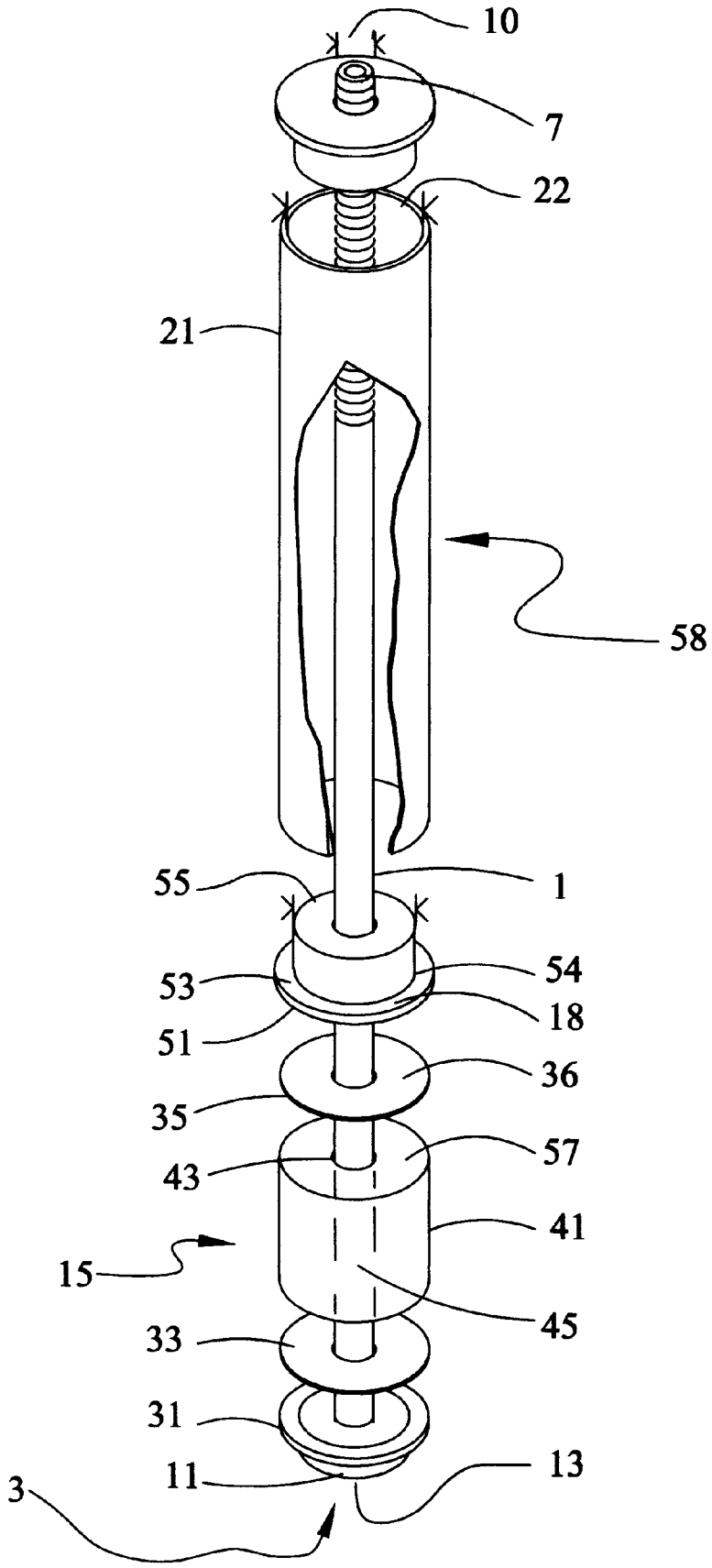
FIG. 2 provides a detailed illustration of the distal end of the probe device showing the base of the basic tube element and details of the stopper element.

FIG. 2 illustrates the details of the proximal end of the rigid sleeve element and the structure of the stopper means 15 and related elements. The base plate 11 is firmly, physically attached, usually by welding, to the distal end 3 of the basic tube element 1. The opening 13 in the center of the base plate 11 is aligned with the open channel 7 of the basic tube element 1. A flat, first metal washer 31 is positioned on the basic tube element 1 and placed on the upper surface 32 of the base plate 11. Said first metal washer 31 may be fused to said base plate 11 to form a single element. Next, a first, polymeric washer 33 is positioned on top of said first metal washer 31. An expandable plug component 41 fashioned from a resilient material in the form of a cylinder with an open core 43 the diameter of which 45 is slightly greater than the outside diameter 10 of the basic tube element is positioned on the basic tube element 1. A second polymeric washer 35 is positioned such that the bottom surface of the washer rests on the top surface 57 of the expandable plug component 41. The second metal washer 51 which includes a flange component 53 and lip 54 fashioned on and part of the upper surface of the said second metal washer 51 is positioned on the basic tube element 1 and contacts the upper surface 36 of the second polymeric washer 35. The outside diameter 55 of the flange component 53 is slightly less than the inside diameter 22 of the rigid sleeve element 21. The rigid sleeve element 21 is positioned such that the distal end 58 of said rigid sleeve element 21 fits over the flange component 53 and contacts on the uppermost surface 18 of the stopper means 15.

Figure 3A:
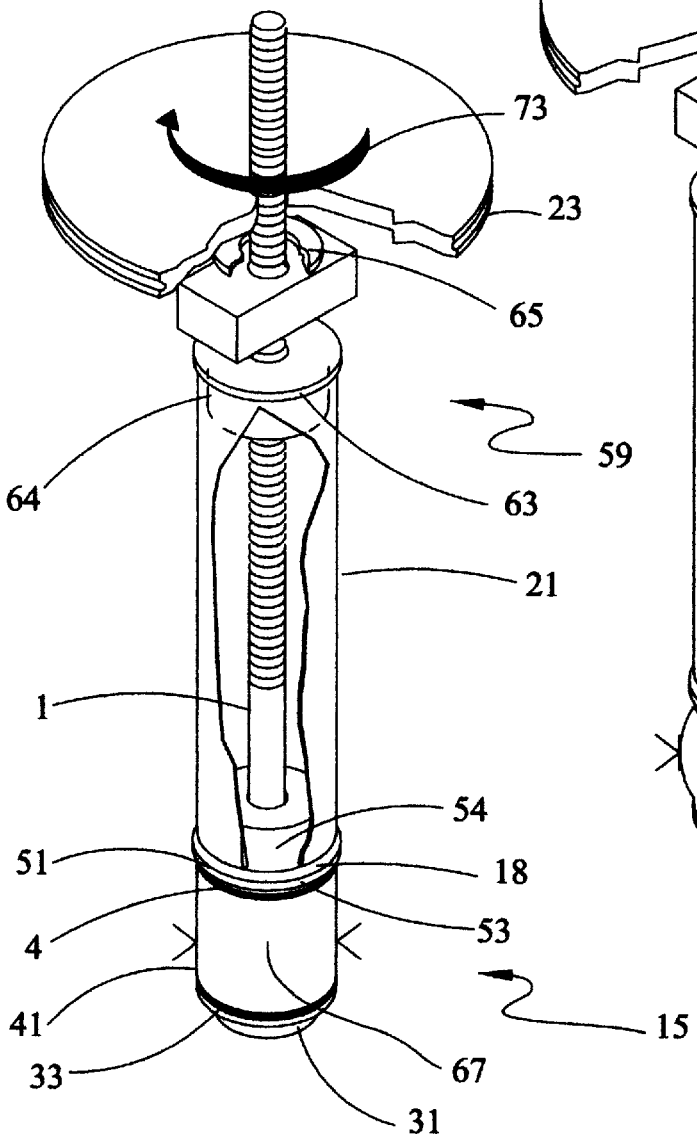
FIGS. 3A and 3B illustrate how mechanical force causes expansion of the stopper element with FIG. 3A representing details of said stopper element and its configuration in the absence of mechanical force and FIG. 3B showing expansion in response to mechanical force.

FIG. 3A illustrates details of the rigid sleeve element 21 and the stopper means 15 with the expandable plug component 41 uncompressed, with an outside diameter 67. Said first polymeric washer 33 is positioned on the upper surface of the first metal washer 31. The expandable plug component 41 is inserted over the basic tube element 1 with the basic tube element 1 positioned so as to be the longitudinal axis of said expandable plug component 41. A second polymeric washer 35 is positioned on the proximal end surface 44 of the expandable plug component 41. A second metal washer 51 with a flange 53 and a lip 54 is positioned on the basic tube element 1 and contacts the upper surface of the second polymeric washer 35. The distal end 58 of the rigid sleeve element 21 contacts the uppermost surface of the stopper means 18 which surface is the lip 54 of the second metal washer 51. The flange 53 of the second metal washer 51 is inserted into the distal end 58 of the rigid sleeve element 21. A third metal washer 62 with a flange 63 and a lip 64 is positioned on the basic tube element 1 such that the flange 63 is inserted into the proximal end 59 of the rigid tube element 21, and the proximal end 59 of said rigid sleeve element contacts the lip 64 of the third metal washer 62. A flat, fourth metal washer 65 is positioned on the inner-tube component, and the lower surface of the fourth metal washer 65 contacts the upper surface of the third metal washer 62. The force control wheel 23 is threaded onto the inner-tube component 1. The bottom surface of the force control wheel 23 rests on the top surface of the fourth flat, metal washer 65.

The effect of rotating the force control wheel 23 in the direction of arrow 73, is to move the rigid sleeve element 21 relative to the inner-tube component 1. Effectively this movement creates a downward force and responsive movement downward of the rigid sleeve element 21. This force is transferred to the expandable plug component 41. Downward movement of the expandable plug component 41 is prevented by base plate 11. As a result, the downward force is expressed as a compression in the axial length of the expandable plug component 41 and a corresponding increase in the diameter of said plug component.

Figure 3B:
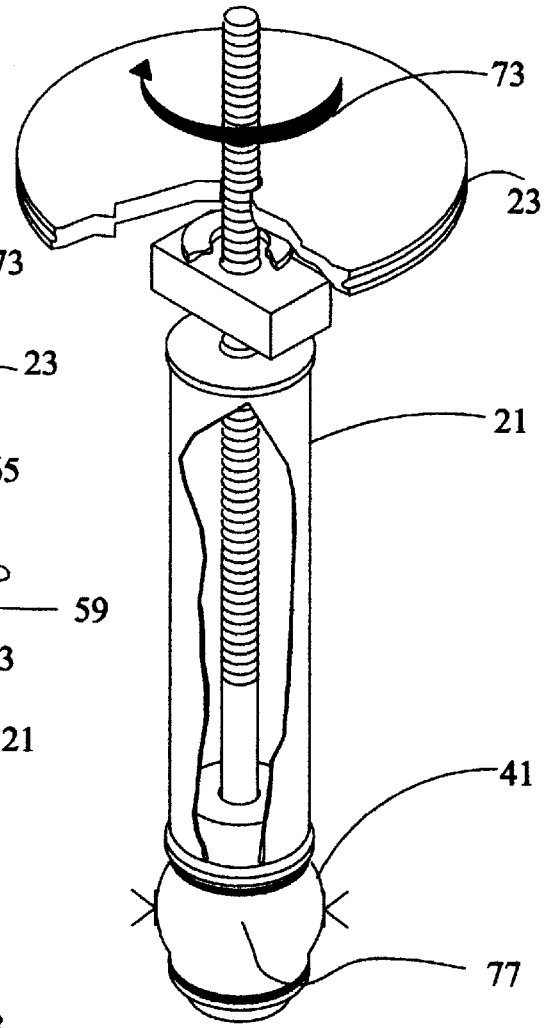

FIG. 3B illustrates the effects of rotating the force control wheel 23. In addition to the elements and components common to FIG. 3A and 3B as indicated by common numeric identification, FIG. 3B shows that rotating the force control wheel 23 in the direction of arrow 73 effectively lowers the rigid sleeve element 21. In response to the lowering of said rigid sleeve element 21, force is transferred to the expandable plug component 41, and as the plug material is compressed, the diameter of said plug material increases from the diameter of the uncompressed material (67 of FIG. 3A) to diameter 77.

Figure 4:
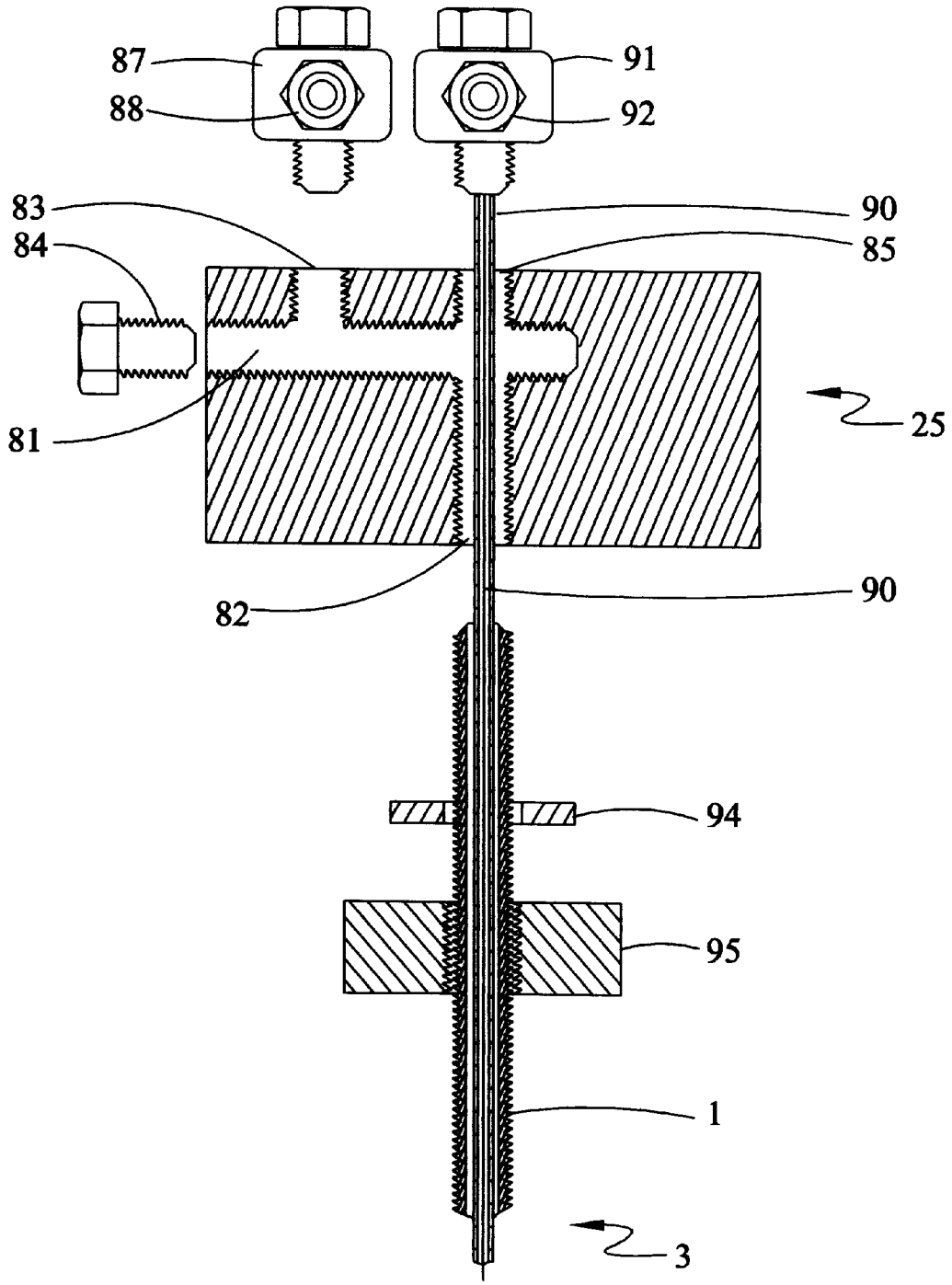
FIG. 4 illustrates the internal structure of the junction element, the pressurized-gas-supplying tube element, and the connections for the measuring/display gauges and source of gas.

FIG. 4 illustrates the junction element 25 that provides for connection of the probe device to measuring equipment and allows gas under pressure to be introduced into the basic tube element 1. The junction element comprises a rectangular block with a lateral channel 81 bored into but not through the junction element, and said lateral channel 81 at approximately its mid-point crosses and is open to the threaded channel 82 into which the basic tube element 1 is inserted, secured, and sealed. The entry end of the lateral channel 81 is tightly closed by means of a threaded bolt 84. A first vertical channel 83 is bored from the upper surface of the junction element 25 into the lateral channel 81. A second vertical channel 85 is also bored from the upper surface of the junction element 25 into the lateral channel 81. A first flexible tube coupling means 87 is threaded into the first vertical channel 83, and a second flexible tube coupling means 91 is threaded into the second vertical channel 85. The first flexible tube coupling component 87 includes a first cone-shaped component 88 to receive and hold flexible tubing connecting said first flexible tube coupling component to a pressure measuring and displaying means. In addition, a thin capillary tube 90 to transmit pressure conditions from the distal end 3 of the basic tube element 1 ultimately to the pressure measuring and displaying means is connected to the inner surface of the first flexible tube coupling component. The capillary tube 90 extends from the first flexible tube coupling component to near the distal end 3 of the basic tube element 1. A second flexible tube coupling component 91 is threaded into the second vertical channel 85. The second flexible tube coupling component includes a second cone-shaped component 92 to receive and secure flexible tubing connected to an independent source of pressurized gas and to deliver said gas via the connected tube to the basic tube element tube element 1. The junction element is secured to the threaded, basic tube element 1 by a first lock washer 94 and a second lock washer positioned immediately below it on the basic tube element.

DETAILED DESCRIPTION OF THE INVENTION

The probe comprises a hollow, basic tube element with an expandable stopper element at the distal end and a mechanical means to apply axial force to said stopper element thereby expanding the plug component of said stopper element in the radial direction. The plug component of the stopper element is a cylinder with an open, center and is fashioned from a resilient, expandable material. The material from which the plug is fashioned must be impervious to the flow of gas. The expandable plug component is positioned on the distal end of the basic tube element with its distal end in contact with the base plate positioned with a metal washer that may be fused to it at the distal end of the basic tube element. The base plate and associated washer do not restrict the axial channel that extends the length of the basic tube element.

A lower metal washer with a flange or collar and lip on one surface and smooth opposite surface is positioned on the basic tube element such that the smooth surface contacts the upper surface of the expandable plug component, and the flange-side is oriented to the proximal end of the basic tube element. The outer surface of the inner tube component element is threaded to receive a control wheel element which is also threaded and adapted to move vertically on the threaded inner tube component when the wheel is rotated.

A rigid sleeve element the outside diameter of which is effectively equal to, or slightly less than the diameter of the stopper element is positioned also above the stopper element in the same fashion as the stopper element such that the basic tube element is positioned as the axis of the rigid sleeve element and stopper element positioned, with respect to the rigid sleeve element, in a distal relationship. The distal end of the rigid sleeve element rests on the lip surface of the lower metal washer. The diameter of the flange of the lower washer is slightly less than the inside diameter of the rigid sleeve so the flange may be inserted into the sleeve. Thus, with these elements positioned on the basic tube element, the flange serves to align the stopper element with respect to the rigid sleeve element.

An upper metal washer identical in size and shape to the lower metal washer is positioned on the basic tube element above the rigid sleeve element with the orientation reversed from that of the lower metal washer. The flange and lip are oriented to the distal end of the basic tube element with the smooth side oriented upwards towards the proximal end. The proximal end of the sleeve element contacts the lip surface and the flange is inserted into the proximal end of the rigid sleeve element. This arrangement serves also to align the rigid sleeve element and stopper element.

A force control wheel is threaded to the exterior of the basic tube element such that rotating said wheel moves the wheel vertically on the basic tube element tube element. As said wheel is rotated clockwise, effectively said wheel moves downward in relation to said stopper element. With the bottom surface of the force wheel in physical contact with the proximal end of the rigid sleeve element by contact with the upper metal washer, the relative downward movement of said wheel exerts a force on the sleeve with which it is physical contact, and this pressure is transmitted to said resilient plug material, thereby causing said plug component to expand radially. Rotating the wheel in the opposite direction reverses the process reducing the pressure on said resilient plug material and allowing it to return to its initial, unexpanded configuration.

The proximal end of the basic tube element is threaded to a junction element which provides the necessary connections for delivering a gas under pressure to the distal end of the probe, measuring the rate of flow of the gas, and measuring gas pressure at the distal end of said probe. A slender capillary tube extends from the pressure coupling element of the junction element to a point near the distal end of the inner tube component so that pressure at this point may be precisely measured. Using standard tubing, a source of pressurized gas is connected to the probe element through the flow control/display means and a pressure measuring/display means is connected to the junction box element.

Practical application of the invention is simple to one familiar with the art. With the distal end first, the basic tube element is inserted into a hole bored in the rock to be studied. The depth of the hole may vary, but it is predetermined by the scientist. The diameter of the hole is fractionally greater than the unexpanded diameter of the stopper element. With the probe inserted into the bored hole, the force wheel is rotated so as to apply pressure to the stopper thereby causing it to expand and form a secure seal with the rock surface of the walls of the hole. Gas is introduced, and when flow rates and pressure are stabilized, appropriate readings are made and recorded. The test is then completed. The wheel rotated in the opposite direction, and the device removed from the hole and ready for repeated use.

Data indicated by the flow and pressure measuring and display means may be expressed in various units and forms, all well known to those skilled in the art. Similarly, said data may be subject to various, different types of analyses to yield information about the permeability of the subject rock material.

Note that with the invention, manual pressure is not required to establish and maintain the seal at the interface of the probe and rock, and permeability determinations are made in the core of the rock, not on its weathered outer surface.

EXAMPLES

Detailed Description of the Manufacture of a Preferred Embodiment

The purpose of this invention is a small device capable of measuring the permeability of rock by means of data from the rate of flow of a gas into a rock and the pressure of that gas with a given flow rate. A further purpose is the insertion of the device into a hole bored into the rock so that the device is sealed in the hole so that pressure and flow measurements are not biased by leakage of the gas or rates of flow distorted and so that measurements are made on, and conclusions applicable to, unweathered rock material.

The figures provide full and detailed descriptions of the structure and functional organization of the new small drill-hole, gas, minipermeameter probe. By examination and study of the figures and the following teaching of how to assemble a preferred embodiment of the device, one of average skill in the art could readily construct a preferred embodiment of the device. The inner-tube component is structurally the backbone of the device. The inner-tube component is made of steel. The length of the tube may vary widely; by way of example, the length of the basic-tube component may range from about approximately 10 cm to 115 cm with a preferred, practical range between 15 cm and 60 cm. In the absence of abuse, strength is not a major consideration so long as all functions of the device proceed normally. The outer diameter of the rigid sleeve ranges from 1.00 cm to 5.00 cm with a preferred range of 1.00 cm to 3.00 cm. The thickness of the walls of the basic tube component is not critical so long as the outer surface of the tube can be threaded without unreasonably weakening the basic tube element, so long as said tube can withstand the pressures to be used in delivering a gas through the tube, and so long as said tube is not so fragile as to bend or break under normal field use. The greater the length of the basic tube element, the greater must be the thickness of the tube walls. In a preferred embodiment in which the length of the basic tube element is 30 cm or less, the outside diameter of the basic tube element is 0.50 cm and the wall thickness is approximately 2 mm. The wall thickness for any given outside diameter fixes the inside diameter of the basic tube element, or the diameter of the open core extending the length of the tube. In this preferred embodiment, the diameter of the core is approximately 14 mm. To accept the junction element and allow the function of the force control wheel, the basic tube component is threaded on its outer surface for a distance of approximately 75 percent of its length. The maximum length of threading is not critical, and the minimum length is described in terms of the relationship of the length of the threading to the length of the rigid sleeve when the sleeve is in place and the stopper element is fully uncompressed. One skilled in the art would recognize this length as the thread extending to a point approximately mid-way along the length of the rigid sleeve. The diameter of the metal base is approximately equal to, but no greater than, the outer diameter of the expandable plug component and is welded to the distal end of the basic tube element at a right angle to the long axis of the element. A flat metal washer is positioned on top of the base plate and may be fused to the base plate.

The second and third metal washers are identical in design. Each has a machined collar element. One skilled in the art could readily manufacture such washers. The diameter of the second and third metal washers is no greater than the diameter of the plug component. The height of the collar is not critical and may vary from a minimum of 2 mm to 2 cm.

The expandable plug component is fashioned from heavy, but compressible rubber in the shape of a cylinder with a hole bored in its center extending the full length of the cylinder. The diameter of the expandable plug component varies with the length of the entire probe. With an overall length of the probe between 15 and 30 cm, the axial length of the expandable plug component would be 2 cm to 4 cm. One skilled in the art would realize that this length is not critical but would be a function of the compressibility and related physical traits of the rubber material from which the plug is formed and the magnitude of expansion needed for effective use of the device. The diameter of the expandable plug component preferably is between one-fourth (¼) and one-half (½) of the axial length of the plug. As with the length of the plug, the diameter is a function of the compressibility of the rubber material and the anticipated expansion. Length and diameter of the plug are inversely related to compressibility of the material from which it is formed. The hole in the center of the expandable plug component is fractionally greater in diameter than the outer diameter of the sleeve element.

As fully illustrated by the FIGS. 1 and 3A, the expandable plug component is positioned on the inner-tube component with the inner-tube component passing through the hole that extends the full longitudinal dimension of the expandable plug component. The bottom of the expandable plug component rests on a polymeric washer. The diameter of the third metal washer is slightly less than the inside diameter of the rigid metal sleeve. The second metal washer is positioned on the basic tube element and moved downward until the bottom surface of the second metal washer contacts the second teflon washer, and functionally contacts the expandable plug component. The rigid sleeve element is positioned over the basic tube element and moved downward until the collar of the second metal washer is fully inserted into the distal end of the rigid sleeve element. The third metal washer which is identical in shape and dimensions to the second metal washer is positioned on the inner-tube component, with the collar facing down. The third metal washer is moved downward until the collar is fully inserted into the proximal end of the rigid sleeve element. A flat, fourth metal washer is positioned on the upper surface of the third metal washer.

The control wheel is made of metal or stiff plastic or similar material. The diameter of the hole in the center of the control wheel is equal to the outer diameter of the inner-tube component, and the hole in the control wheel is threaded such that said wheel is adapted to be rotatably connected to the inner-tube component by the threads on the inner-tube component. The control wheel is positioned on the tube element and rotated downward until the lower surface of said wheel is in contact with the bottom surface of the fourth, flat washer as that washer is positioned against the third metal washer, which washer is in physical contact with the rigid sleeve element.

The junction element is fashioned from a solid rectangular block of light metal such as aluminum. Dimensions of the block are of no essential concern, so long as the block is sufficiently large enough to accommodate threading of the inner-tube component to its lower base and positioning of two tube coupling elements on the opposite surface while retaining adequate strength when essential openings are bored in it. One skilled in the art would readily recognize acceptable dimensions for the block; by means of illustration, but not limitation, block dimensions of 5 cm long by 2 cm wide by 4 cm high. Greater length and width are required as the diameter of the inner-tube component increases. With little or no experimentation, one of average skill in the art would readily make appropriate changes in the block to satisfy specific dimensions of other components of the device.

Four interconnecting holes must be bored in the block. The first hole extends from one end of the block in a line across the long dimension of the block to the other end of the block, but does not exit the block. The opening of this hole is capped by a cap nut threaded into the hole. The diameter of the hole is no greater than the diameter of the inner-tube component, although diameter is not critical. Two holes are bored from the upper surface of the block vertically into the block so that they intersect and open into the first hole described above. A coupling means is threaded into each vertical hole. These means are adapted to connecting the block by rubber or plastic tubes to either a pressure measuring and displaying means or a gas flow meter which is in turn connected to an independent source of gas under pressure. The fourth hole is bored in the center of the bottom of the block and extends vertically into the first hole. This fourth hole is threaded to allow secure insertion by threaded means of the proximal end of the tube element.

A thin capillary tube capable of transmitting gas is connected to the pressure measuring coupling means. This capillary tube extends from the point of connection into the first hole and into the inner-tube component that is threaded into the bottom of the block. The capillary tube terminates 2 to 10 mm from the distal end of the tube element.

Prior to attaching the tube element to the block, a lock nut and plastic washer are positioned on the tube element. The washer is positioned against the bottom of the block when the tube element is firmly connected to the block and the lock nut is rotated upward tightly against the washer thereby locking the tube element to the block in a manner well known to those of average skill in the art. With the tube element in place, the first hole capped, and coupling means positioned, the block functionally serves as a cap to the inner-tube component.

The preceding descriptions with reference to the figures as might be useful individually, provides complete, clear, and detailed instructions as to a best mode contemplated to make the small drill-hole, mini gas permeameter.

Detailed Description of the Use of a Preferred Embodiment

Use of a preferred embodiment of the device comprises a series of simple, specific steps. Technical factors related to selection of a field site are not considered because they are not part of or critical to the invention. Similarly, the special mathematical methods applied to the analysis of data are not part of the invention and not considered.

The first step in field use of the invention is boring a hole in the rock to be examined. The diameter of the hole should be fractionally larger than the maximum, uncompressed diameter of the expandable plug component. In no instance may the diameter of the hole exceed the maximum diameter to which the expandable plug component can be expanded. The depth of the hole should be no greater than the length of the basic tube element from its distal end to approximately one-half the length of the rigid sleeve. This depth ensures adequate travel of the control wheel to apply force to expand the plug component. The distal end of the hole as a consequence of the normal shape of a drill bit is conical in configuration.

The pressure detecting/displaying means and source of pressurized gas are connected to their corresponding coupling elements using standard laboratory rubber or plastic tubing. Note the flow measuring means must be positioned between the source of pressurized gas and the corresponding coupling means. Generally the pressurized gas is either air or nitrogen.

The second step is simply inserting the distal end of the inner-tube component into the hole until the base plate contacts bottom of the hole where it becomes conical. It is unnecessary to press the tube element against the bottom of the hole. At this point the pressure at the end of the hole should be equal to ambient pressure.

With the probe in place, rotate the control wheel so as to apply force against the expandable plug component thereby causing the plug component to expand and seal the inner-tube component in the hole.

With the device properly positioned and all elements properly connected, start the flow of gas. The flow rate and pressure can be monitored as required. As the pressurized gas flows into the hole, it disperses in a characteristic pattern downward, laterally, and back to the rock surface. The pattern of dispersion varies with the type of rock, but this does not affect the use of the device. The rate of flow, or movement of the gas into the rock and the pressure under which such flow stabilizes is a measure of the permeability of the rock. The determination is made when both the pressure and flow rate have become stabilized (time independent). For most rocks this is a matter of several seconds to several minutes. Gauge pressure applied varies as a function of the type of rock studied. The normal range extends from near zero to two standard atmospheres. When readings are completed, the gas flow is terminated and data recorded, the control wheel rotated to release the pressure on expandable plug component, and the probe removed from the hole and ready for continued use.

What is claimed is:

1. A small drill hole, mini gas permeameter device comprising:

a. a basic tube element with a distal end and a proximal end, a portion of said basic tube element extending from and including said proximal being threaded to receive parts and elements of said device, and a base plate permanently attached to said distal end of said basic tube element with a first metal washer positioned on said basic tube element on said base plate and optionally fused to said base plate;

b. a stopper means comprising an expandable plug component, said plug component having a distal end and a proximal end and being capable of being inserted over said basic tube element by means of a longitudinal channel bored with a diameter said channel being bored in the center of and extending the length of said expandable plug component, the distal end of said expandable plug contacting the first metal washer, and a second metal washer with one smooth surface, the other surface having a vertical collar and adjacent lip, said second metal washer being positioned on said basic tube element such that said smooth surface contacts the proximal end of said expandable plug component, and a flange is positioned towards said proximal end of said basic tube element;

c. a rigid sleeve element comprising a distal end, a proximal end, and an open core with a diameter, said rigid sleeve element being positioned on said basic tube element with said basic tube element extending through said rigid sleeve element and oriented as the central axis of said rigid sleeve element and said distal end of said sleeve element contacting said lip of said second metal washer and said flange of said second metal washer being inserted into the open, distal end of said rigid sleeve, and further comprising a third metal washer with a smooth surface and a surface with a collar and a lip, said third metal washer being positioned on said basic tube element such that the proximal end of said rigid sleeve element contacts said lip of said third metal washer and the collar of said third metal washer is inserted into the proximal end of said rigid sleeve element;

d. a threaded, force control wheel capable of vertical movement on said basic tube element, said force control wheel having an upper surface and a lower surface and being rotatably connected to said basic tube element by said thread on said basic tube element, said lower surface of said force control wheel being in contact with the smooth surface of said third metal washer; and e. a junction element comprising a rectangular block with a top surface, a bottom surface, a first end, a second end, a front face, a rear face, and a core, and said core having a first channel bored horizontally from said first end to, but not through, said second end, a second channel bored through said base to intercept said first channel, a third channel bored through said upper surface to intercept said first channel, and a fourth channel bored parallel to said third channel to independently intercept said first channel; wherein, said proximal end of said basic tube element is threaded to said second channel to connect said basic tube element and said rectangular block, a first connection means for linking said device to a source of gas under pressure is threaded to said third channel, a second connection means for linking said device to pressure sensing and data recording means is threaded to said fourth channel, a thin capillary is connected to said second connection means and extends from said fourth channel into said basic tube element terminating near said distal end of said basic tube element, and lock washer means are threaded on said basic tube element and contact the bottom surface of said rectangular block.

* * * * *